United States Patent [19]

von Pieverling

[11] Patent Number: 4,536,763
[45] Date of Patent: Aug. 20, 1985

[54] ON-BOARD ORIENTATION DEVICE FOR AIRCRAFT

[75] Inventor: Klaus von Pieverling, Wolfratshausen, Fed. Rep. of Germany

[73] Assignee: Siemens Aktiengesellschaft, Berlin and Munich, Fed. Rep. of Germany

[21] Appl. No.: 319,705

[22] Filed: Nov. 9, 1981

[51] Int. Cl.³ .............................................. G01S 13/60
[52] U.S. Cl. .................................. 343/9 R; 343/7 TA
[58] Field of Search ................. 343/5 R, 7 TA, 11 R, 343/16 R, 5 DP, 9 R, 5 T; 455/60, 226

[56] References Cited

U.S. PATENT DOCUMENTS

| | | | |
|---|---|---|---|
| 3,025,517 | 3/1962 | Watson et al. | 343/16 R |
| 3,060,423 | 10/1962 | Goldan | 343/16 R |
| 3,391,339 | 7/1968 | Lynch | 455/60 X |
| 3,701,989 | 10/1972 | Calhoon, Sr. et al. | 343/16 R |
| 3,918,055 | 11/1975 | Shimizu et al. | 343/5 R |
| 3,961,264 | 6/1976 | Hekimian et al. | 455/226 X |
| 4,197,535 | 4/1980 | Köethmann et al. | 343/5 DP |

FOREIGN PATENT DOCUMENTS 2543373  3/1978  Fed. Rep. of Germany .

Primary Examiner—T. H. Tubbesing
Assistant Examiner—Brian S. Steinberger
Attorney, Agent, or Firm—Hill, Van Santen, Steadman & Simpson

[57] ABSTRACT

A pulse radar device which can sweep in the azimuth direction with a two element direction finding antenna (1, 2) having a fan pattern and wherein the path differences and Doppler frequencies are ranged selective to determine at each azimuth from the echo signals received a mean aspect angle ($\epsilon$) and the azimuth maximum Doppler frequency which can be calculated therefrom. The mean aspect angles ($\epsilon$) are determined according to the values of the measured Doppler frequencies with the equation $\epsilon = \arccos(f_d/f_{dmaxa})$. In this angle determination, smaller aspect angles are determined according to the measurement of the range selective determined path differences. Subsequently, an image point vertical deflection which is proportional to the aspect angle is utilized for perspective terrain display. The invention can be employed with pulsed radar devices on-board aircraft L for terrain display and for obtaining navigation data.

2 Claims, 5 Drawing Figures

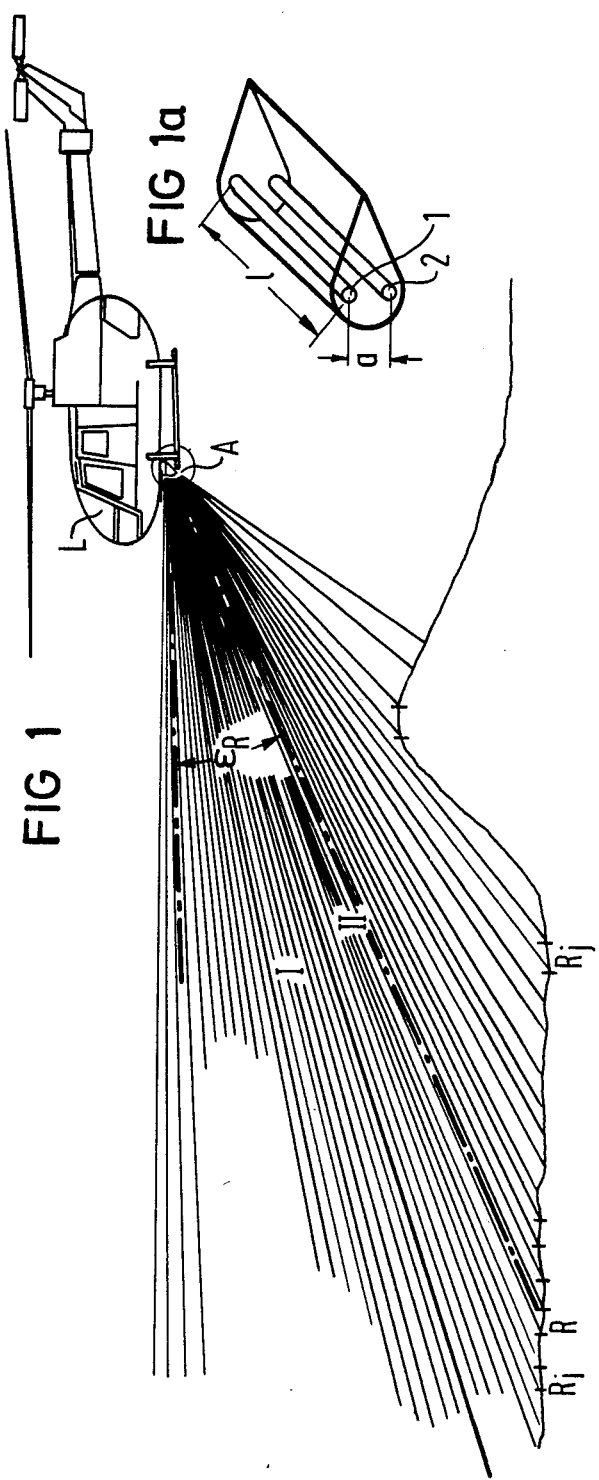

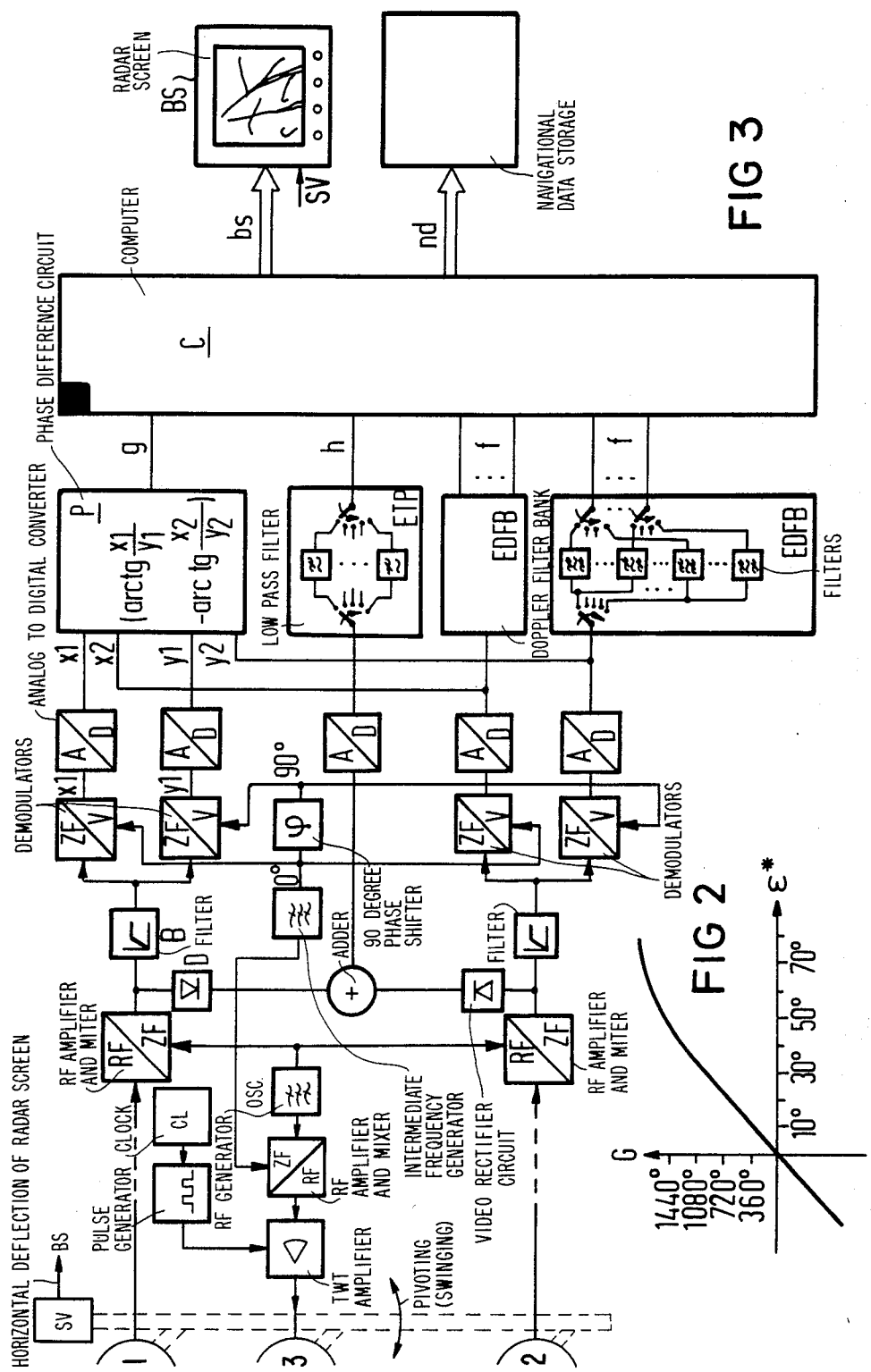

ON-BOARD ORIENTATION DEVICE FOR AIRCRAFT

BACKGROUND OF THE INVENTION

1. Field of the Invention

The invention relates in general to navigation equipment for aircraft and particularly for on-board radar equipment for aircraft.

2. Description of the Prior Art

On board vehicles such as aircraft, it is often desirable to illustrate portions of the terrain using radar independently of optical equipment so as to orientate the aircraft relative to the ground. With the use of a map-like presentation, such as are generally obtained with high range resolution surveillance radar using antennas with high azimuth focusing capability frequently do not give sufficient results and on the contrary a perspective representation of the terrain indicating the altitude and if desired of the gradient of their horizon is desirable so as to provide the observer with information concerning the environment of the aircraft and its movement as would be accomplished with direct optical sighting and if necesary to provide the pilot with obstacle warnings.

It is known from German LP No. 2,543,373 to provide a beam antenna which can be focused in the azimuth direction to approximately 0.5° and having elevation focusing of approximately 60° in or on the aircraft with the beam antenna sharply focusing its radiation in the azimuth direction and covering a greater angular range in elevation and the azimuth scanning of the section of terrain to be surveyed is accomplished in chronological succession by means of scanning the antenna in the azimuth direction such that at each azimuth angle illuminated by the vertical pattern of the antenna, the terrain supplies a mixture of echo signals which differ in the transit time respectively proportional to the range of the respective reflecting elements of the terrain as well as having different Doppler frequencies $f_d$ based on the relationship $f_d = f_{dmax\alpha} \cdot \cos \epsilon = (2v_{H\alpha}/\lambda) \cdot \cos \epsilon$, wherein $v_{H\alpha}$ represents the aircraft's velocity in the direction of the selected azimuth, $\lambda$ is the radar wavelength and $\epsilon$ is the aspect angle which the terrain is scanned relative to the azimuth velocity component in the azimuth direction for the vertical image display at each azimuth. The echo signals respectively received in successive time range windows and from successive range areas are analyzed as to their Doppler frequency and for purposes of display on the picture screen the light spot is vertically deflected proportional to the respective aspect angle $\epsilon$ in other words, according to the measure of the magnitude $\epsilon = \arccos (f_d/f_{dmax\alpha})$, so that given the respective incidence of an echo at its specific aspect angle $\epsilon$ the light spot has reached a deflection proportional to the aspect angle whereby standard time dependent and thus range dependent gain control of the echo signal is provided so the brightness of the image point is independent of the range of the respective reflecting point.

By connecting the individual azimuth scans adjacent to each other on the picture screen a perspective picture of the terrain can be generated such that the representation of the aspect angle is always related to the azimuth motion component of the aircraft relative to the ground and is not related to the aircraft axis.

SUMMARY OF THE INVENTION

It can be derived from the above-mentioned relationship between the aspect angle $\epsilon$ and the Doppler frequency $f_d$, a reference frequency which is the azimuth maximum Doppler frequency $f_{dmax\alpha}$ which is utilized for determining the respective aspect angle from the respective Doppler frequency whereby the measuring precision and angular resolution of the aspect angle depends upon the precision in determining the reference frequency and which may require on the aircraft a corresponding sensor for example a Doppler navigation radar unit.

The invention relates to a device for on-board orientation of aircraft moving relative to the ground in which an antenna has a sharply focused beam in the azimuth direction and covers a larger angular range of elevation and scans the section of terrain to be surveyed in chronological succession by rotating in azimuth and at each azimuth angle the terrain supplies a mixture of echo signals from the angular range illuminated by the vertical pattern. Both of the different transit times are respectively proportional to the range of the respectively reflecting terrain points and different Doppler frequencies are received based on the following relationship $f_d = f_{dmax\alpha} \cdot \cos \epsilon = (2v_{H\alpha}/\lambda) \cdot \cos \epsilon$, wherein $v_{H\alpha}$ represents the aircraft's velocity in the direction of the azimuth, $\lambda$ represents the radar wavelength and $\epsilon$ represents the aspect angle where the relevant terrain point is covered and relates to the azimuth velocity vector. A vertical image representation of each azimuth scan is illuminated by a respective plurality of radar wave pulses and, the echo signals respectively received in successive time range windows and thus from successive range areas are analyzed in terms of their Doppler frequencies. For displays on the picture screen the light spot can be vertically deflected proportional to the respective aspect angle $\epsilon$ so that in response to an echo received at a specific aspect angle $\epsilon$ and received with a specific amplitude the image point producing said echo with a corresponding brightness has a deflection proportional to the aspect angle.

The invention utilizes a beam antenna which has at least one reception rod antenna to form a direction finder and having two reception antenna rods mounted parallel to each other and spaced a distance ($5\lambda$) of a few wavelengths and wherein the path differences and phase difference between the echo signals received from one and the other reception antenna rods is respectively determined by the phase angle subtraction individually related to the range gate and which is stored and wherein for each range gate a determination of the Doppler frequency is made and a reference frequency $$f_{dmax\alpha} = \frac{\sqrt{f_{di}^2 + f_{dj}^2 - 2 \cdot f_{di} \cdot f_{dj} \cdot \cos((G_i - G_j)/s)}}{\sin((G_i - G_j)/s)}$$

is determined from the path differences and the Doppler frequencies of at least two range gate areas wherein $f_{di}$ and $f_{dj}$ represent the Doppler frequencies determined in such range gate, $G_i$ and $G_j$ represent the path differences determined in the appertaining range gates and s represents the steepness of path differences depending upon the respective aspect angle $\epsilon^*$ as related to the normal on the antenna plane. For the purposes of terrain display on the radar screen in a range of mean aspect angles, which is approximately 15°–75° the light spot is vertically deflected approximately proportional to the chronological course of the quantity $$\epsilon_{II} = \arccos \frac{f_d \cdot \sin((G_i - G_j)/s)}{\sqrt{f_{di}^2 + f_{dj}^2 - 2 \cdot f_{di} \cdot f_{dj} \cdot \cos((G_i - G_j)/s)}}$$

wherein $f_d$ represents the Doppler frequency which has just been determined.

The invention solves $\epsilon_i - \epsilon_j = \epsilon^*_i - \epsilon^*_j$ with a negligible error to determine the reference frequency $$fd_{dmaxa} = \frac{\sqrt{f_{di}^2 + f_{dj}^2 - 2 \cdot f_{di} \cdot f_{dj} \cdot \cos((G_i - G_j)/s)}}{\sin((G_i - G_j)/s)}$$

given rough directional coincidence of the longitudinal axis of the aircraft and the antenna normal with the velocity vector and the azimuth velocity component result in the advantage of high precision in the determination of the azimuth maximum Doppler frequency without requiring the use of other devices and thus makes it possible to obtain a corresponding high measuring precision and angular resolution of the aspect angle and a correspondingly distortion-free display of the terrain in the range of the mean aspect angle.

In addition, a precise determination of the respective azimuth velocity vector which corresponds to the high precision of the azimuth maximum Doppler frequency is possible in a further development of the invention where the reference frequency $$f_{dmaxa} = \frac{\sqrt{f_{di}^2 + f_{dj}^2 - 2 \cdot f_{di} \cdot f_{dj} \cdot \cos((G_i - G_j)/s}}{\sin((G_i - G_j)/s}$$

determined from the path differences and Doppler frequencies determined in the range gates under consideration is used for the determination of the azimuth velocity vector $$v_{Ha} = \lambda \cdot f_{dmaxa}/2$$

In a further development of the invention, the reference frequency $$f_{dmaxa} = \frac{\sqrt{f_{di}^2 + f_{dj}^2 - 2 \cdot f_{di} \cdot f_{dj} \cdot \cos((G_i - G_j)}}{\sin((G_i - G_j)/s)}$$

determined from the path differences and the Doppler frequencies determined in the two range gates can be stored relative to the respective azimuth angle $\alpha$, related to the longitudinal axis of the aircraft and the highest reference frequency occurring during an azimuth change can be used for determining the horizontal velocity vector $$v_H = \lambda \cdot f_{dmax}/2$$

where a precision which corresponds to the high precision in the determination of the azimuth maximum Doppler frequency is obtained.

The reference frequency $$f_{dmaxa} = \frac{\sqrt{f_{di}^2 + f_{dj}^2 - 2 \cdot f_{di} \cdot f_{dj} \cdot \cos((G_i - G_j)/s)}}{\sin((G_i - G_j)/s)}$$

is expediently determined by determining the path differences and the Doppler frequencies of two range gates which are further apart and corresponding approximately to an aspect angle difference in the magnitude of 30° through 60° so that a compromise is made between the demand for path differences which deviate as much as possible from each other for increasing the precision and the desire for as linear relationship between the path difference and the aspect ratio.

It should be pointed out that the determination of the velocity vectors used for the actual vehicle navigation according to the measurement of the reference frequency determined from the path differences and the Doppler frequencies determined in at least two selected range gates in the same manner as the determination of the reference frequency can under certain conditions be accomplished proportional to the chronological path of the magnitude $\epsilon_{II}$ listed above independently of a terrain display on the radar screen and thus independently of a vertical deflection of a corresponding light spot and thus this feature is an additional aspect of the invention.

Expediently, the determination of the aspect angle $$\epsilon_{II} = \arccos \frac{f_d \cdot \sin((G_i - G_j)/s}{\sqrt{f_{di}^2 + f_{dj}^2 - 2 \cdot f_{di} \cdot f_{dj} \cdot \cos((G_i - G_j)/s)}}$$

and, under certain conditions, the vertical deflection of the light spot on the radar screen depending upon the measurement of the magnitude $\epsilon_{II}$ is accomplished up to a lower cutoff aspect angle with a magnitude of approximately 15° through 20° since due to measuring errors resulting from the function of the $\sin_\epsilon^{-1}$ (presuming constant measuring precision for the Doppler frequency $f_d$—the measuring precision, i.e.), the coincidence of the actual as-pect angle of a terrain point with the display on the radar screen greatly decreases with a decreasing aspect angle $\epsilon$ so that an increasing distortion of the image occurs and at the same time the measuring resolution and thus the picture sharpness also decreases with a decreasing aspect angle $\epsilon$. In a range of smaller aspect angles following a lower cutoff aspect angle, a further development of the invention expediently provides that the light spot is vertically deflected in each radar pulse at least approximately proportional to the chronological course of the magnitude $$\epsilon_I = \epsilon_{II/I} - (G - G_{II/I})/S$$

wherein G is the path difference which has just been determined, $\epsilon_{II/I}$ is a reference aspect angle of the mean aspect angle range (II) and $G_{II/I}$ is the path difference and S is the steepness of the path difference which is determinant in the range of small aspect angles and the reference aspect angle $\epsilon_{II/I}$ can also be given by means of the lower cutoff aspect angle.

The invention utilizes the interrelation between the path difference and the aspect angle $\epsilon^*$ which essentially follows a sine function and extends approximately linear with considerable steepness in the range of small aspect angles and with given small aspect angles particularly over flat terrain and higher flight altitudes and high radar range resolution, a clear continuous interrelationship between the aspect angle and the terrain point range is usually obtained so that in each range gate generally only one echo signal which is considerably more precise and a narrow frequency band represented with a uniformly rotating vector with superimposed amplitude and phase is received and changes of the aspect angle are referred back to changes of the target range and are derived in different range gates from the differences in the path.

It is also expedient to incline the direction finding antenna plane in the direction of the longitudinal axis of the aircraft approximately 10° with respect to the vertical axis of the aircraft such that the surroundings of the aircraft determining the orientation are more favorably illuminated and in a further development of the invention the direction finding antenna can have a separate transmission antenna rod mounted between two receiving antenna rods to obtain a correspondingly increased symmetry of the direction finding antenna and to eliminate the need to change between one of the two antennas between reception and transmission modes.

Other objects, features and advantages of the invention will be readily apparent from the following description of certain embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 illustrates an aircraft flying over a terrain and illustrates different aspect angle ranges;

FIG. 1a is an enlarged detail view of a direction finding antenna mounted on the aircraft;

FIG. 2 is a plot comprising a discriminator curve which shows the interrelationship between the path difference and the aspect angle; and FIG. 3 is a circuit block diagram illustrating a sample embodiment of the device according to the invention.

Figure 1B:
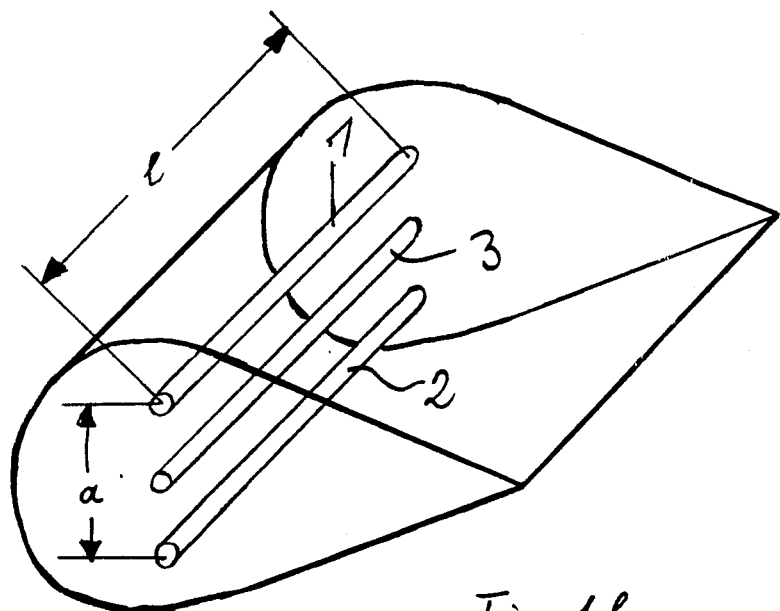
FIG. 1b illustrates a modification of the antenna.

DESCRIPTION OF THE PREFERRED
EMBODIMENTS

FIG. 1 illustrates an aircraft L as, for example, a helicopter or other type of aircraft upon which is mounted an antenna A which is sharply focused in the azimuth angle but carries a substantially greater angular range in the elevation angle which is the plane of the drawing in FIG. 1. The antenna A can be mechanically or electronically rotated in the azimuth direction. Angular jumps up for example ±20° as is indicated in FIG. 1 can be made. At least two reception antenna elements 1 and 2 are mounted in the center antenna position with their longitudinal axes parallel to the crossaxis of the aircraft and parallel to each other and with one above the other and they are spaced apart a few wavelengths as, for example, 5λ which would be a spacing of a =40 mm utilizing a wavelength λ=8 mm. With an operating frequency of, for example, 40 GHz and a length l of the antennas elements 1 and 2 of 1.5 m, the antenna A can be focused in the azimuth direction to 0.5° and illuminates an angular range in the elevation angle in the vertical plane of, for example, 60° as shown in FIG. 1 which covers two partial ranges I and II. So as to better illuminate the ranges lying below the longitudinal axis of the aircraft, the antenna plane can be expediently inclined downwardly for example by approximately 10° relative to the vertical axis of the aircraft.

When the antenna A comprises as indicated in FIG. 1a only the two antenna rods 1 and 2 then one of the two antenna rods is alternately employed as a transmission and reception antenna in pulsed operation and the other is used only as a receiving antenna. However, a modification from that illustrated in FIG. 1a is possible wherein the antenna includes a separate transmission antenna rod mounted between the two receiving antenna rods 1 and 2. FIG. 1b shows in a perspective view an antenna arrangement in which, between two receiving antenna rods 1 and 2 which are used exclusively for reception, a separate third transmitting antenna 3 for transmission is provided. The two receiving antenna rods 1 and 2 form the direction-finder antenna into which the transmitting antenna rod 3 is integrated. Since a separate transmitting antenna rod 3 is present it is not necessary, as in FIG. 1a, for one of the two receiving antenna rods 1 or 2 to be alternately switched over during pulse operation to the transmitter, and then back to the receiver, respectively. It is desirable that the direction finding antennas shown in FIGS. 1a and 1b be constructed aerodynamically as illustrated to provide minimum drag.

In response to each wave train radiated by the direction finding antenna A, the terrain reflects a mixture of echo signals from the angular range illuminated by the fan-shape diagram and the echo signals have different transit times respectively proportional to the range of the respective reflecting terrain points as well as different Doppler frequencies $f_d$ which has the relationship $f_d = f_{dmaxa} \cdot \cos \epsilon = (2v_{Ha}/\lambda) \cos \epsilon$. Where $v_{Ha}$ represents the aircraft velocity in the direction of the azimuth angle, $\lambda$ is the radar wavelength and $\epsilon$ is the respective aspect angle related to the azimuth velocity vector associated with the particular terrain element under consideration. The aspect angle $\epsilon_R$ is indicated in FIG. 1 for a terrain element which is located in a range gate range R and which has an echo signal which appears at the receiving antennas 1 and 2 in a time window offset with respect to the emission of the respective radar wave train by an amount of 2R/c of the to and return transit time.

As a rule, a phase difference exists between the echo signals received in the two antenna rods 1 and 2 reflected from one and the same terrain element and the space difference is also referred to as the path difference G and which as is known can be employed for locating a target according to the relationship $G = (2\pi a \cdot \sin \epsilon^*)/\lambda$ where a represents the spacing of the two receiving antennas, $\lambda$ is the radar wavelength and $\epsilon^*$ is the aspect angle related to the principal antenna direction. In a mean aspect angle range II as is indicated in FIG. 1 and for at least two suitably selected range gate ranges which preferably are separated by an aspect angle difference in the range of 30° to 60° and are identified in FIG. 1 as $R_i$ and $R_j$. The respective path differences (phase difference) between the echo signals received by the two receiving antennas 1 and 2 from the same terrain element are determined by way of a phase angle subtraction individually related to the range gate and are stored in a memory and simultaneously the echo signals respectively received from the associated range gates are analyzed relative to their Doppler frequency. Subsequently, the azimuth maximum Doppler frequency $$f_{dmaxa} = \frac{\sqrt{f_{di}^2 + f_{dj}^2 - 2 \cdot f_{di} \cdot f_{dj} \cdot \cos((G_i - G_j)/s)}}{\sin((G_i - G_j)/s)}$$

serves as a reference frequency and can be determined for the particular azimuth. Thus, $f_{di}$ and $f_{dj}$ represent the Doppler frequencies determined in the previously addressed range gates ($R_i$, $R_j$), $G_i$ and $G_j$ represent the path differences determined in the associated range gates and s is the path difference steepness dependent upon the respective aspect angle $\epsilon^*$.

Referring to FIG. 2, the interrelationship between path difference G and the aspect angle $\epsilon^*$ related to the longitudinal axis of the aircraft is illustrated and it is to be noted that it essentially coincides with a sine function. Thus, with given aspect angles which are not too large, it can be observed that an approximately linear interrelationship exist over a relatively large range of aspect angles. The steepness of the example plotted in FIG. 2 has the relatively large value of 31.4° path difference per each degree of aspect angle.

Also, the determination of the respective azimuth reference frequency $f_{dmaxa}$ need not be recalculated during every radar pulse periods since no corresponding fast changes are to be expected and, therefore, a determination of the respective azimuth reference frequency suffices for approximately every second spacing.

For the purpose of terrain representation on the radar screen, a light spot at least in range II of the mean aspect angle is vertically deflected for each radar pulse period and is deflected at least approximately proportional to the chronological variation of the magnitude $$\epsilon_{II} = \arccos \frac{f_d \cdot \sin((G_i - G_j)/s)}{\sqrt{f_{di}^2 + f_{dj}^2 - 2 \cdot f_{di} \cdot f_{dj} \cdot \cos((G_i - G_j)/s)}}$$

where $f_d$ represents the Doppler frequency determined in the range gate R which has just been utilized.

FIG. 3 comprises a circuit diagram for practicing the invention which illustrates only the receiving portion of the device. It is to be realized that the transmitter radiates a signal which is reflected from various points on the terrain and the reflected signal is received by the antennas 1 and 2 illustrated in FIG. 3. The antennas 1 and 2 can be mechanically or electronically rotated by means of a pivoting device not shown in greater detail in FIG. 3 and which can be accomplished in a known manner as, for example, as illustrated in German LP No. 2,543,373. For explanation and understanding of the invention, only one azimuth need be considered but it is to be realized, of course, that the apparatus operates in the same manner for each different azimuth angle to which the antennas 1 and 2 are rotated.

The echo wave pulse trains at 40 GHz in the example are received by the two receiving antennas 1 and 2 and are converted in the RF amplifiers and mixers ZF to a suitable IF intermediate frequency. The output of the mixers ZF/V go to single sideband video demodulator circuits and the four demodulators (ZF/V) each receive outputs of an intermediate frequency generator Z either directly or through a 90° phase shifter and the single sideband video demodulator circuits convert the respective IF signals into the single side base band components where two respective base bands signal components x, y which are 90° with respect to each other are obtained which are subsequently also respectively converted from analog to digital conversion in four analog to digital converters A/D illustrated.

The outputs of the four analog to digital converters A/D develop the $x_1$, $y_1$, $x_2$, $y_2$ signals associated with the antennas 1 and 2 and are fed to a phase difference circuit P. The phase angle of the respective echo signals can be obtained from the signal components x and y using the relationship of arc tangent x/y and the respective path difference G between the echo signals received at the two reception antennas 1 and 2 from the same terrain element can be determined in a small computer C or, alternatively, by the use of a table stored in a memory driven in response to the measurement of the respective signal components $x_1$, $y_1$; $x_2$, $y_2$ and the path difference is determined by phase angle subtraction using the equation G=arc tangent $x_1/y_1$ —arc tangent $x_2/y_2$. The output of the phase difference circuit P produces the signal G which is fed through the computer C. Thus, the phase angle difference is successively determined individually related to the range gate in a manner such that the wave train echos obtained from successive range gates ... $R_i$, ... $R_j$, ... R ... as illustrated in FIG. 1 respectively reach the receiving antennas 1 and 2 in succession and are subject to phase angle subtraction individually one from the other for each terrain location. The path differences indicated by the signals appearing on the output lines g can be stored in the computer C which includes storage and which can be a central on-board computer.

Also, at least the signal component x and y which were derived from the echo signals received by one of the two reception antennas 1 and 2 and in particular the signal components $x_2$ and $y_2$ in the example illustrated in FIG. 3 are analyzed relative to their respective Doppler frequencies using a range selective Doppler filter bank EDFB. Doppler filter banks as illustrated in FIG. 3 as EDFB are known in the art and as indicated in FIG. 3 may contain a plurality of narrow band filters which respectively transmit only one of the possible Doppler frequencies and which can be switched in parallel at the input side for each range gate with the filters being connected at their output sides in correlation to the range gate to output lines f associated with individual Doppler frequencies. The Doppler filter banks EDFB receive the output of the analog to digital converters which are at the bottom of the group of analog to digital computers in FIG. 3 and receive inputs from the second antenna 2. In actual practice, the digital filter will be selected as a digital fast Fourier transformer whereby the range selective Doppler filter bank EDFB receives the output of the analog to digital converter A/D illustrated in FIG. 3. The Doppler frequencies indicated by the signals on the output lines f are supplied to the central on-board computer C.

Information concerning the path differences $G_i$, $G_j$ and the Doppler frequencies $f_{di}$, $f_{dj}$ of at least two suitably selected range gates $R_i$, $R_j$ of the mean aspect angle range II qualitatively illustrated in FIG. 1, with the ranges $R_i$, $R_j$ preferably being selected so that they are apart from each other by approximately corresponding to an aspect angle difference in the magnitude of 30° to 60° is supplied to the central airborne computer C which determines the azimuth maximum Doppler frequency $$f_{dmaxa} = \frac{\sqrt{f_{di}^2 + f_{dj}^2 - 2 \cdot f_{di} \cdot f_{dj} \cdot \cos((G_i - G_j)/s)}}{\sin((G_i - G_j)/s)}$$

and serves as the reference frequency for the corresponding azimuth and in which s is the path difference steepness depending upon the respective aspect angle $\epsilon^*$.

Referring again to FIG. 2 which illustrates the relationship between the path difference G and the aspect angle $\epsilon^*$ related to the longitudinal axis of the aircraft which essentially follows a sine function, it can be observed that with given aspect angles which are not too large an approximately linear relationship exists for a relatively wide aspect angle range wherein the steepness S in the example plotted in FIG. 2 has a value of 31.4° path difference per degree of aspect angle.

For the purpose of representing the terrain on radar screen BS which receives the output from the central airborne computer C through a cable including a number of output lines bs, the central computer utilized the calculated reference frequency at least in range II shown in FIG. 1 having mean aspect angles for obtaining the vertical deflection signal for the scanning light spot so that the light spot will be vertically deflected during each radar pulse period at least proportional approximately to the chronological progression of the magnitude $$\epsilon_{II} = \text{arc cos } (f_d/f_{dmaxa}).$$

For this purpose, the signals representing the individual Doppler frequencies $f_d$ can be subjected to an amplitude weighting corresponding to the function of arc cos $(f_d/f_{dmax})$ and can subsequently be combined in chronological sequence as, for example, as is taught in German LP No. 2,543,373.

The central airborne computer C can also utilize the reference frequency $f_{dmaxa}$ determined from the path differences $G_i$ and $G_j$ and the Doppler frequency $f_{di}$, $f_{dj}$ determined in the selected range gates $R_i$, $R_j$ illustrated in FIG. 1 for determining the azimuth velocity vector $v_{Ha} = \lambda \cdot f_{dmaxa}/2$, where the individual reference frequencies $f_{dmaxa}$ can be respectively stored in the airborne computer C and associated with the respective azimuth angle $\alpha$ related to the zero angle of the antenna and, thus, also related to the longitudinal axis of the aircraft and wherein the highest reference frequency occurring during a change in azimuth of the antenna can be utilized for determining the horizontal velocity vector according to the equation $$v_H = \lambda \cdot f_{dmax}/2$$

As is indicated in FIG. 3, for this purpose the central airborne computer C supplies navigational data through the output nd.

The determination of the aspect angle $$\epsilon_{II} = \text{arc cos } \frac{f_d \cdot \sin((G_i - G_j)/s)}{\sqrt{f_{di}^2 + f_{dj}^2 - 2 \cdot f_{di} \cdot f_{dj} \cdot \cos((G_i - G_j)/s)}}$$

and the vertical deflection of the image point on the radar screen BS will be dependent upon the magnitude $$\epsilon_{II} = \text{arc cos } (f_d/f_{dmaxa})$$

which as explained above will expediently be accomplished only in a mean aspect angle range extending to a lower cutoff aspect angle in the range of approximately 15° through 20° as is qualitatively indicated in FIG. 1 with the aspect angle range II. In a range of smaller aspect angles as is qualitatively indicated in FIG. 1 with the aspect angle range I it is recommended that the central airborne computer determine the respective aspect angle $\epsilon_I$ according to the relationship $$\epsilon_I = \epsilon_{II/I} - (G - G_{II/I})/S$$

wherein S is the substantially constant path difference steepness in the range I for a small aspect angle and as shown in FIG. 2 in the example is 31.4° path difference per degree of aspect angle. In general, any aspect angle with a mean aspect angle range II for example, the lower cutoff aspect angle can be selected as the reference aspect angle $\epsilon_{II/I}$ by reference to the respective independent measurement of instantaneous path differences and Doppler frequencies and, thus, the independent determination of aspect angles in the mean aspect angle range II illustrated in FIG. 1, a clear relationship of the determination of the aspect angle $\epsilon_I$ used in range I having smaller aspect angles allows the determination of the aspect angle $\epsilon_{II}$ in the mean aspect angle range II. For this purpose, the path differences G successively occurring and individually related to the different range gates in the aspect angle range I are determined in the phase difference circuit P in the circuit arrangement illustrated in FIG. 3 and by using the corresponding signals occurring on the output lines g are supplied to the central airborne computer C where they are linked to the values $\epsilon_{II/I}$, $G_{II/I}$ and S which are stored in the computer. For the purposes of terrain representation on the radar screen BS which is controlled by the airborne computer C with the output lines bs, a vertical deflection signal can be produced proportional to the amplitude of the respective aspect angle $\epsilon_I$ to drive the trace of the indicator.

For controlling the brightness of the image point, the intermediate frequency signals produced by the two intermediate frequency converters RF/ZF illustrated in FIG. 3 supply a respective output to a pair of video rectifier circuits D which may be expediently logarithmic for compensating of the range condition to echo signal dynamic and the outputs of the rectifier circuits D are combined in the adder indicated with a plus sign and supplied through a fifth analog to digital converter A/D to a low pass filter ETP. The output of the low pass filter ETP is supplied on line h to the central computer C. This information is supplied on the bundle of lines bs to the brightness control of the picture screen BS. As illustrated in FIG. 3, the range selective low-pass filter ETP is connected in line h and may be a low-pass filter with comb filter properties which reduces the information density in other words, reduces the data supply to the airborne computer C and, thus, a potential overload of the computer can be avoided and at the same time, the precision of the operation will be increased. In FIG. 3, the comb filter is illustrated as a low-pass filter bank driven in the clock range of the range gates and in practice it will be desirable to utilize a digital filter which is preceeded by the analog to digital converter as is illustrated in FIG. 3. Also, low-pass filters which retain the range selection can be inserted in the circuit of FIG. 3 in output lines g and f before the central airborne computer C so as to reduce the data flow, for example, from approximately 80 Mbit/s overall to approximately 1 Mbit/s so as to prevent a potential overload of the airborne computer C and at the same time to achieve increased precision. Such low-pass filters are not illustrated in detail in FIG. 3 however. FIG. 3 illustrates a number of elements which are the same as those shown in FIG. 2 of German DE-PS No. 2,543,373. The transmitting antenna 3 is fed by a travelling wave amplifier TWT which is pulsed by the pulse generator and also receives an input from the RF amplifier and mixer which has an output frequency that is formed by mixing the frequencies of two generators OSC which is the RF generator and the output of the oscillator Z which is the intermediate frequency generator. The two receiving antennas 1 and 2 are also illustrated and the two receiving antennas 1 and 2 as well as the transmitting antenna 3 can be pivoted or swung in the azimuth direction around an azimuth pivot axis as illustrated in FIG. 3. In FIG. 3, the transmit radiation is emitted from the transmit antenna 3 which is pivoted in common with the reception antennas 1 and 2 by using a mechanical or electronic pivot means and are horizontally pivoted in for example a range of ±20°. The pivot means SV supplies a horizontal deflection signal for the radar viewing screen BS as illustrated.

Although the invention has been described with respect to preferred embodiments, it is not to be so limited as changes and modifications can be made which are within the full intended scope of the invention as defined by the appended claims.

I claim as my invention:

1. A device for on-board orientation in vehicles, such as aircraft which move relative to the ground, comprising a beam antenna which is sharply angularly focused in azimuth and less sharply focused in elevation and which scans the terrain in azimuth by swinging the radiating energy from said antenna, a receiver receiving from said antenna at each azimuth angle from the terrain at the angular range illuminated by the vertical antenna pattern a mixture of echo signals having different transit times which are respectively, proportional to the range of the respectively reflecting terrain elements and have different Doppler frequencies $f_d$ according to the relationship $f_s = f_{dmax\alpha} \cdot \cos = (2v_{H\alpha}/\lambda) \cdot \cos \epsilon$, wherein $v_{H\alpha}$ is the aircraft velocity in the direction of the azimuth angle, $\lambda$ is the radar wavelength and $\epsilon$ is the aspect angle of the appertaining terrain element, an image display device connected to said receiver for displaying a vertical image display of each azimuth angle which is illuminated by a plurality of radar wave trains, and the echo signals respectively received during successive time windows range gates and, thus, from successive distance range gate ranges and which are analyzed as to their Doppler frequencies, and said display device having a light spot for display on its picture screen which is vertically deflected proportional to the respective aspect angle, so that, in response to an echo received at a specific aspect angle and with a specific amplitude, the image spot is reproduced from such echo with a corresponding brightness and deflection which is proportional to the aspect angle, characterized in that the antenna is formed of at least two reception antenna rods (1 and 2) to form a direction-finding antenna and said antenna rods (1, 2) are mounted parallel to each other with a spacing of a few wavelengths, and the path difference (G) between echo signals received at the two reception antenna rods (1, 2) from the same terrain element (R) is determined by phase angle subtraction of the phase angles individually related to the range gate and is stored in a storing means, and the Doppler frequency is determined for each range gate, and the reference frequency $$f_{dmax\alpha} = \frac{\sqrt{f_{di}^2 + f_{dj}^2 - 2 \cdot f_{di} \cdot f_{dj} \cdot \cos((G_i - G_j)/s)}}{\sin((G_i - G_j)/s)}$$

is determined from the path differences and Doppler frequencies of at least two range gate ranges, wherein $f_{di}$ and $f_{dj}$ are the Doppler frequencies determined in the range gate ranges, $G_i$ and $G_j$ are the path differences determined in the appertaining range gate ranges, and s is the path difference steepness dependent on the respective aspect angle $\epsilon^*$, and for terrain representation on the radar screen, the light spot in at least one range (II) of mean aspect angles is vertically deflected approximately proportional to the magnitude $$\epsilon_{II} = \arccos \frac{f_d \cdot \sin((G_i - G_j)/s)}{\sqrt{f_{di}^2 + f_{dj}^2 - 2 \cdot f_{di} \cdot f_{dj} \cdot \cos((G_i - G_j)/s)}}$$

wherein $f_d$ is the Doppler frequency which has been determined.

2. A device according to claim 1 characterized in that the direction-finding antenna has a separate transmission antenna rod mounted between two reception antenna rods (1, 2).

* * * * *